United States Patent
Taima et al.

(10) Patent No.: US 6,225,979 B1
(45) Date of Patent: May 1, 2001

(54) CURSOR DISPLAY METHOD AND APPARATUS FOR PERCEIVING CURSOR AS STEREOSCOPIC IMAGE IN STEREOSCOPIC DISPLAY REGION, AND RECORDING MEDIUM RECORDED WITH CURSOR DISPLAY PROGRAM THAT CAN BE READ OUT BY COMPUTER

(75) Inventors: Kenji Taima, Moriguchi; Kazuhiko Shiono, Yao, both of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/114,966

(22) Filed: Jul. 14, 1998

(30) Foreign Application Priority Data

Jul. 22, 1997 (JP) .................................................... 9-195878

(51) Int. Cl.[7] .................................................. H04N 13/00
(52) U.S. Cl. .......................... 345/157; 345/139; 345/145; 345/115; 348/42; 348/51
(58) Field of Search ................................ 345/115, 139, 345/145, 157; 348/42, 51

(56) References Cited

U.S. PATENT DOCUMENTS

| | | | |
|---|---|---|---|
| 4,791,478 | * 12/1988 | Tredwell et al. | 348/42 |
| 4,808,979 | * 2/1989 | DeHoff et al. | 345/145 |
| 5,162,779 | * 11/1992 | Lumelsky et al. | 345/139 |
| 5,258,833 | * 11/1993 | Schenk | 348/51 |
| 5,805,132 | * 9/1998 | Imaizumi et al. | 345/112 |
| 5,917,486 | * 6/1999 | Rylander | 345/339 |
| 5,929,841 | * 7/1999 | Fujii | 345/145 |
| 5,973,689 | * 10/1999 | Gallery | 345/339 |
| 5,982,366 | * 11/1999 | Nakase | 345/339 |
| 6,023,276 | * 2/2000 | Kawai et al. | 345/419 |

FOREIGN PATENT DOCUMENTS

| | | |
|---|---|---|
| 07236164 | 9/1995 | (JP) . |
| 8-329275 | 12/1996 | (JP) . |
| 09139957 | 5/1997 | (JP) . |
| 09171378 | 6/1997 | (JP) . |

OTHER PUBLICATIONS

Patent Abstracts of Japan entitled Stereoscopic Picture Operation dated Dec. 12, 1996.

* cited by examiner

Primary Examiner—Bipin Shalwala
Assistant Examiner—Vincent E. Kovalick
(74) Attorney, Agent, or Firm—Arent Fox Kintner Plotkin & Kahn, PLLC

(57) ABSTRACT

When a CPU of a computer in which a cursor display apparatus is incorporated reads out the position of a cursor in a display which is input through an input operation unit, determination is made whether the read out cursor position is inside or outside a stereoscopic image display region of the display. When the read cursor position is within the stereoscopic image display region, bit map image data for two cursors is displayed according to the read cursor position. When the read cursor position is outside the stereoscopic image display region, one cursor is displayed by the OS of the computer according to the read cursor position. Therefore, in a display including a stereoscopic image display region and a plane image display region, a cursor can be displayed in a manner switched between a stereoscopic image and a plane image according to the display region.

9 Claims, 6 Drawing Sheets

CURSOR DISPLAY METHOD AND APPARATUS FOR PERCEIVING CURSOR AS STEREOSCOPIC IMAGE IN STEREOSCOPIC DISPLAY REGION, AND RECORDING MEDIUM RECORDED WITH CURSOR DISPLAY PROGRAM THAT CAN BE READ OUT BY COMPUTER

BACKGROUND OF THE INVENTION

1. Field of the Invention

The present invention relates to a cursor display method and apparatus therefor, and a computer-readable recording medium in which a cursor display program is recorded. More particularly, the present invention relates to a cursor display method and an apparatus for providing a display of a cursor in a stereoscopic image display region of the display so as to perceive the cursor as a stereoscopic image, and a computer-readable recording medium in which a cursor display program is recorded.

2. Description of the Background Art

FIG. 9 is a diagram for describing a cursor display manner in a conventional binocular stereoscopic display. In the conventional usage of a binocular stereoscopic display connected to a computer for displaying an image L for the left eye and an image R for the right eye constituting a stereoscopic image adjacent in the horizontal direction (or in the vertical direction), there was a disadvantage that the cursor can be viewed by only one eye so that a stereoscopic cursor could not be perceived since only one cursor is provided on the display as shown in FIG. 9.

An approach has been proposed to solve this disadvantage, as disclosed in, for example, Japanese Patent Laying-Open No. 8-329275. However, this publication teaches only the technique for a stereoscopic display of a cursor provided on a binocular stereoscopic display of the computer. It is silent on the switching display between a stereoscopic display and a plane display of a cursor on the same display.

SUMMARY OF THE INVENTION

An object of the present invention is to provide a cursor display method and apparatus that can switch the display of a cursor to either a stereoscopic image or a plane image corresponding to the display region in a display that includes at least either a stereoscopic image display region or a plane image display region, and a recording medium in which a cursor display program is recorded and that can be read out by a computer.

According to an aspect of the present invention, a cursor display method provides a display of a cursor in a display that has at least either a stereoscopic image display region or a plane image display region. This cursor display method includes the steps of reading the position of a cursor in a display that is designated by input, determining whether the read out cursor position is inside or outside the stereoscopic image display region, displaying an image for a stereoscopic cursor image according to the read out cursor position in response to the determination that the position is inside the stereoscopic image display region, and displaying a plane cursor image according to the read out cursor position in response to determination that the position is outside the stereoscopic image display region.

When determination is made of which region the read out cursor position is present, i.e., in the stereoscopic image display region or in the plane image display region, the stereoscopic cursor display step or the plane cursor display step is effected to provide either a stereoscopic image or plane image of the cursor according to the read cursor position.

Accordingly, the user can always identify the position of the cursor with both eyes in a display that has at least one of a stereoscopic image display region and plane image display region, independent of the display region. Therefore, proper positioning of the cursor is allowed.

When a plurality of different plane images with parallax are displayed in alignment in a stereoscopic image display region of the display, the stereoscopic cursor display step provides a plane cursor image at a position that is determined corresponding to the read out cursor position for each of the plurality of different plane images. Therefore, the position of the cursor can always be identified with both eyes independent of the display format of the stereoscopic image display region.

The position determined corresponding to the read out cursor position is adjusted for each of the plurality of different plane images according to the degree of parallax. Accordingly, the cursor display position in each plane image in the stereoscopic image display region can be adjusted according to the degree of parallax. Therefore, the relationship of the cursor position between each of the plane images can be controlled to allow the cursor to be moved in the screen direction of depth (the direction farther away from the front panel side) in the stereoscopic image display region.

The image displayed in the stereoscopic image display region can be perceived as a stereoscopic image without any special eyeglasses. Therefore, an image including the cursor displayed in the stereoscopic image display region of the display can be perceived without using any special eyeglasses.

An image displayed in the stereoscopic image display region of the above display can be perceived as a stereoscopic image using special eyeglasses. Therefore, an image including the cursor displayed in the stereoscopic display region can be perceived as a stereoscopic image using special eyeglasses.

A cursor display apparatus according to an aspect of the present invention is directed to display a cursor in a display having at least either a stereoscopic image display region or a plane image display region. The apparatus includes a cursor position reader for reading out the position of a cursor on a display that is designated, a position determination unit for determining whether the read out cursor position is inside or outside the stereoscopic display region, a cursor display unit for providing an image display for a stereoscopic cursor image according to the read out cursor position in response to the determination by the position determination unit that the position is within the region, and a plane cursor display unit for displaying a plane cursor image according to the read out cursor position in response to the determination by the position determination unit that the cursor position is outside the region.

Therefore, when determination is made by the position determination unit that the cursor position read out by the cursor position reader is in either the stereoscopic image display region or the plane image display region on the same display, either the stereoscopic cursor display unit or the plane cursor display unit displays the cursor in a stereoscopic or plane image.

In a display having at least either a stereoscopic image display region or a plane image display region, the user can always identify the cursor position with both eyes independent of the display region. Therefore, proper positioning of the cursor is allowed.

When a plurality of different plane images with parallax are displayed in alignment in the stereoscopic image display region of the display in the cursor display apparatus, the stereoscopic cursor display unit displays a plane cursor image at the position determined corresponding to the read out cursor position for each of the plurality of different plane images. Therefore, the position of the cursor can be always identified with both eyes independent of the display format of the stereoscopic image display region.

The position determined corresponding to the read out cursor position is adjusted for each of the plurality of different plane images according to the degree of parallax.

Since the cursor display position in each plane image in the stereoscopic image display region can be adjusted according to the degree of parallax, the relationship of the cursor position between each plane image can be controlled so that the cursor can be moved in the screen direction of depth in the stereoscopic image display region.

An image displayed in the stereoscopic image display region can be perceived as a stereoscopic image without any special eyeglasses.

An image displayed in the stereoscopic image display region can be perceived as the stereoscopic image using special eyeglasses.

In a computer-readable recording medium in which a cursor display program is recorded according to an aspect of the present invention, a program is recorded for a computer to execute a method of displaying a cursor in a display having at least one of a stereoscopic image display region and a plane image display region. This method includes the steps of reading out the designated position of a cursor in a display, determining whether the read out cursor position is inside or outside the stereoscopic image display region, displaying an image for a stereoscopic cursor image according to the read out cursor position in response to the determination that the position is within the stereoscopic image display region, and displaying a plane cursor image according to the read out cursor position in response to the determination that the position is outside the stereoscopic image display region.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

Figure 1:
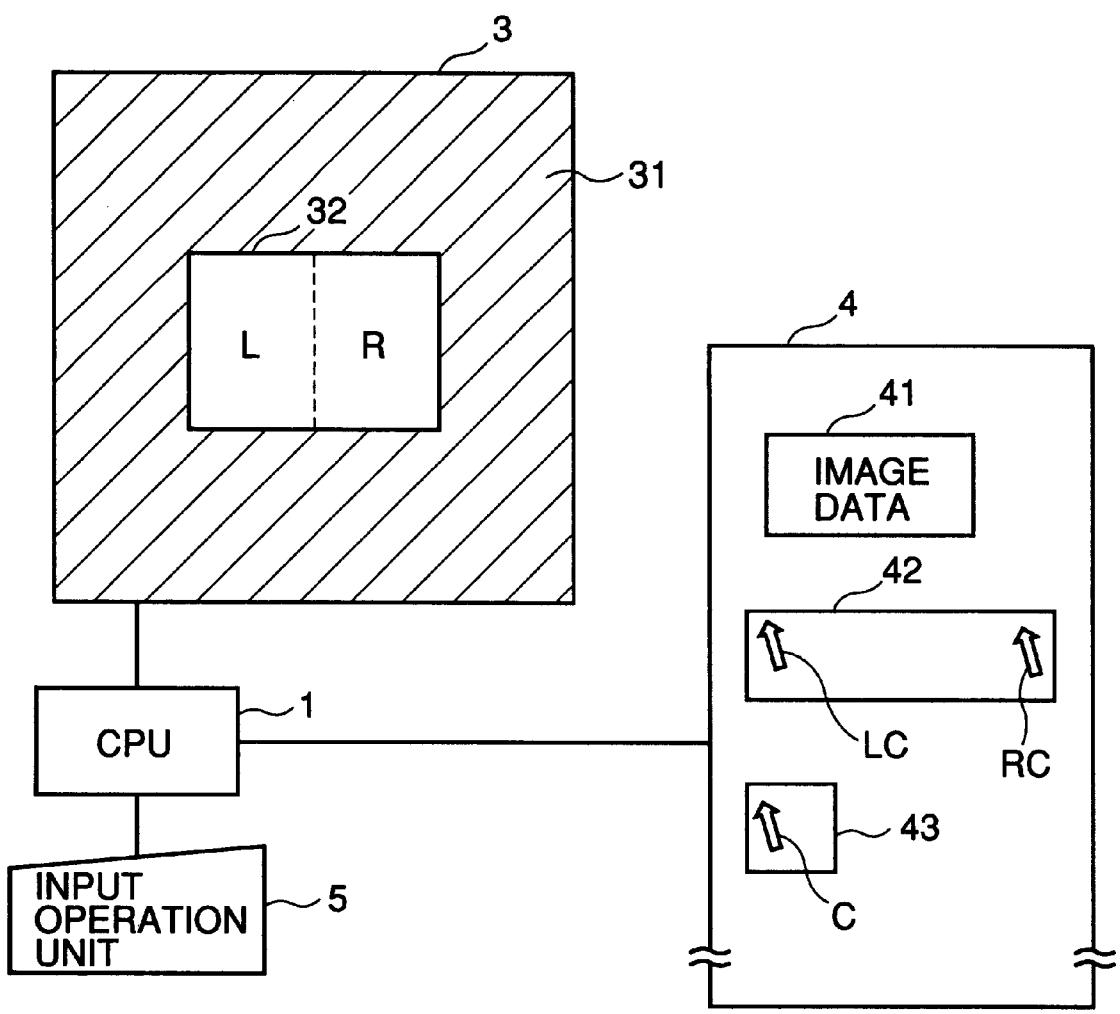
FIG. 1 shows the elements of a cursor display apparatus according to an embodiment of the present invention.

FIG. 1 is a schematic diagram of a cursor display apparatus according to an embodiment of the present invention. The cursor display apparatus is incorporated, for example, in a computer and the like connected with a display that allows stereoscopic display. The cursor display apparatus of FIG. 1 includes a CPU 1 for controlling and monitoring the apparatus, a display 3 with a plane image display region (referred to as 2D region hereinafter) 31 and a stereoscopic image display region (referred to as 3D region hereinafter) 32, a memory 4, and an input operation unit 5 with a coordinate value input device such as a keyboard for data input and a mouse for moving the cursor displayed on display 3.

3D region 32 is set at an arbitrary designated region in display 32 under control of CPU 1. Display 3 includes an image splitter and a special shutter so that the image in 3D region 32 can be perceived as a stereoscopic image without any special eyeglasses. In the 3D image display mode, the image splitter and the special shutter are controlled by CPU 1 so that the display image of 3D region 32 can be perceived as a stereoscopic image without the usage of special eyeglasses.

In 3D region 32 of display 3, a left-eye image L and a right-eye image R are displayed in horizontal alignment.

Figure 2:
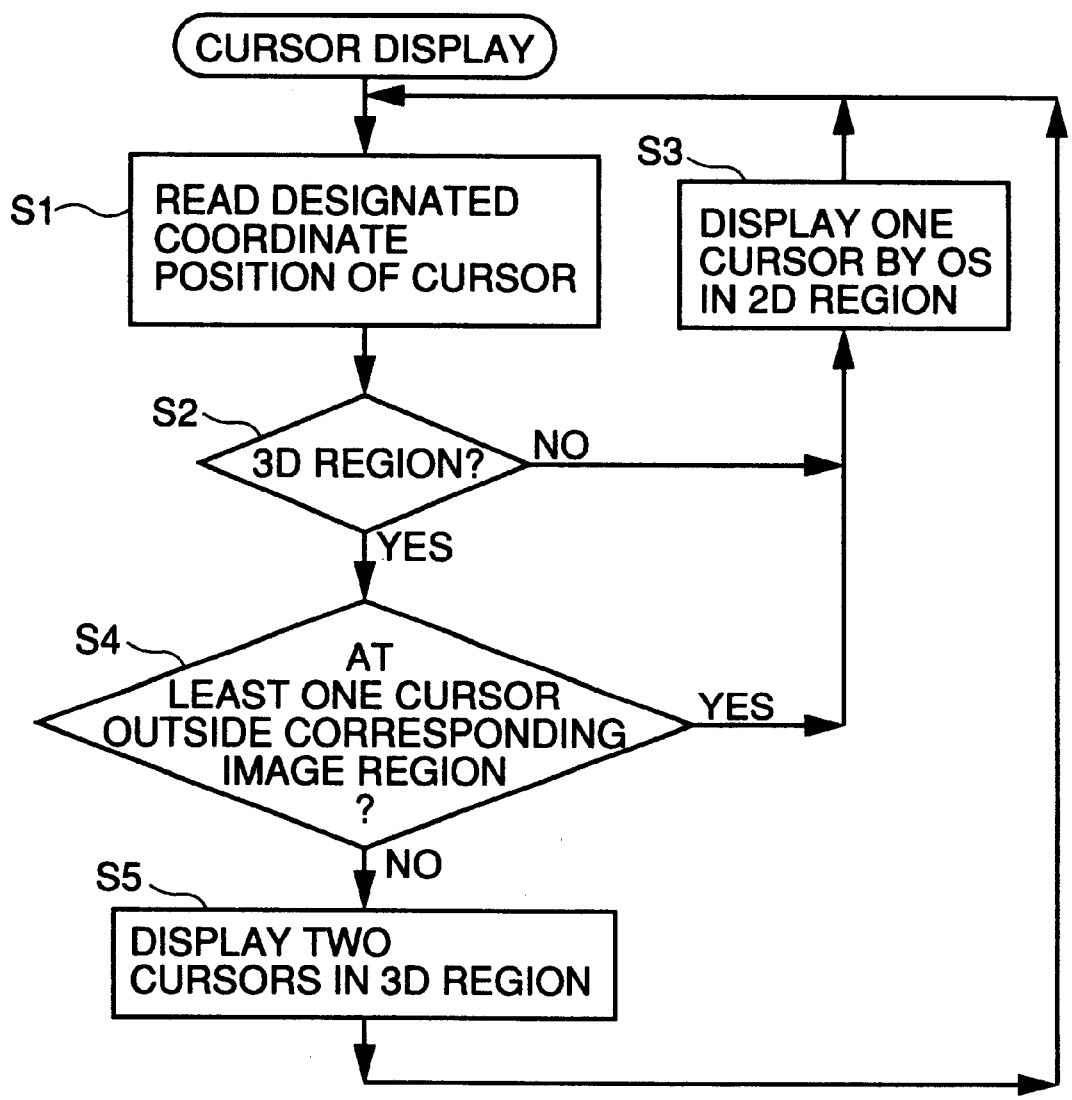
FIG. 2 is a flow chart of a cursor display process according to the cursor display apparatus of FIG. 1.

Various image data 41 including data of left-eye image L and right eye image R for a stereoscopic image, bit map image data 42 for two cursors, bit map image data 43 for one cursor, and a program corresponding to the flow chart of FIG. 2 are prestored in memory 4.

Under the OS (Operating System) of the computer in which this cursor display apparatus is incorporated, one cursor is shifted in display 3 according to the relative shift amount input through the coordinate input device of input operation unit 5. The currently obtained cursor display position is referred to as "default position" hereinafter.

The cursor displayed in 3D region 32 of display 3 is processed as one picture image. More specifically, 2-cursor bit map image data 42 developed in the horizontal direction with the image of two cursors is prepared in memory 4 so that cursors LC and RC for the left eye and the right eye, respectively, are displayed for left-eye image L and right-eye image R in 3D region 32. In bit map image data 42, the images of left-eye cursor LC and right-eye cursor RC are developed so as to be aligned horizontally apart from each other by the relative distance in the horizontal direction between left-eye image L and right-eye image R.

In 3D region 32 of display 3, CPU 1 carries out the process so that bit map image data 42 is displayed by substituting the one cursor at the default position. Therefore, the cursor position can be identified with both eyes in 3D region 32.

Also, 1-cursor bit map image data 43 with the image of one cursor C developed can be prepared in memory 4. The cursor at the default position according to the OS and a cursor C according to bit map image data 43 at a position apart by the relative distance in the horizontal direction can be displayed at the same time. Thus two cursors, one for the left eye and one for the right eye, can be displayed.

FIG. 2 is a flow chart of the cursor display process according to the cursor display apparatus of FIG. 1.

Figure 3:
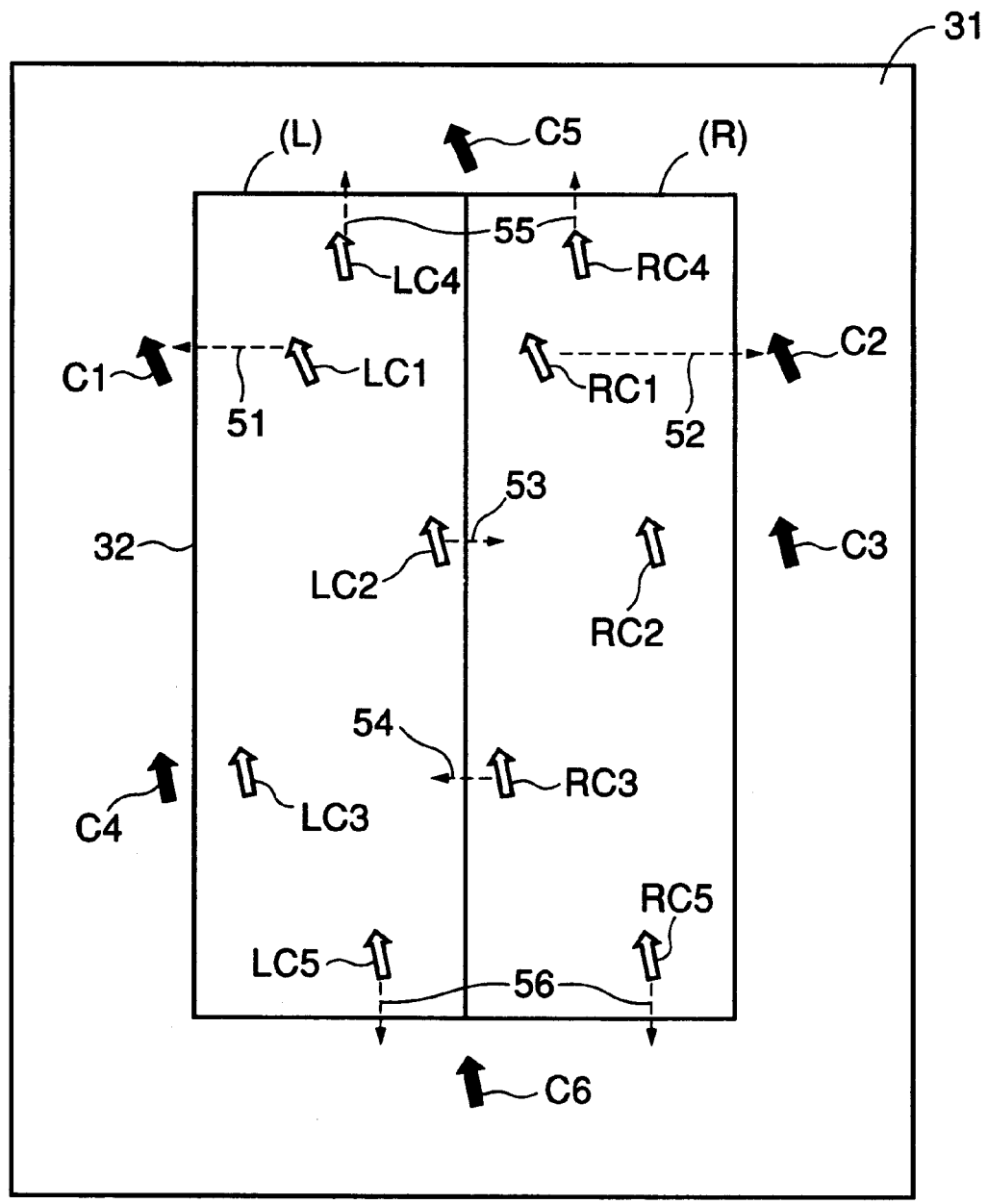
FIG. 3 is a diagram for describing cursor display switching between a 3D region and a 2D region by the cursor display apparatus of FIG. 1.

FIG. 3 is a diagram for describing the switching of cursor display between the 3D region and the 2D region by the cursor display apparatus of FIG. 1.

In FIG. 3, two cursors are displayed in 3D region 32. When the cursor default position is moved so that at least one of the two cursors is outside the region corresponding to the L image and the R image in 3D region 32, a switching process is effected so that one cursor is displayed in 2D region 31 by the OS.

More specifically, when the default position is detected in 3D region 32, a left-eye cursor LCi and a right-eye cursor RCi that form a pair as shown in FIG. 3 (i=1, 2, 3, ... ) are displayed at the same time. For example, when the default position is shifted in the direction of the dotted arrow 51 so that left-eye cursor LC1 moves from the display region of left-eye image L to 2D region 31, cursors LC1 and RC1 disappear from display 3, and a cursor C1 is displayed at the default position by the OS.

Similarly, when the default position is moved in the direction of dotted arrow 52 so that right-eye cursor RC1 is shifted from the region of right-eye image R into 2D region 31, cursors LC1 and RC1 disappear from display 3 and a cursor C2 is displayed at the default position by the OS.

Similarly, when the default position is moved in the direction of dotted arrow 53 so that left-eye cursor LC2 is shifted from the region of left-eye image L to the region of right-eye image R, cursors LC2 and RC2 disappear from display 3. A cursor C3 is displayed at the default position by the OS. When the default position is moved in the direction of dotted arrow 54 so that right-eye cursor RC3 is shifted from the region of right-eye image R to the region of left-eye image L, cursors LC3 and RC3 disappear from display 3, and a cursor C4 is displayed at the default position by the OS.

When the default position moves upwards or downwards of dotted arrow 55 or 56 so that the left-eye cursor (LC4 or LC5) or the right-eye cursor (RC4 or RC5) is shifted from 3D region 32 to 2D region 31, the left-eye cursor (LC4 or LC5) and the right-eye cursor (RC4 or RC5) disappear from display 3, and a cursor (C5 or C6) is displayed at the default position by the OS.

The cursor display process will be described hereinafter with reference to the flow chart of FIG. 2.

CPU 1 reads the position (coordinate values) of the cursor designated through the coordinate value input device of input operation unit 5 (S1). Determination is made whether the default position is in 3D region 32 (S2). When the default position does not correspond to 3D region 32 (S2:NO), the cursor is displayed at the default position by the OS (S3). The designated default position of the cursor is read again (S1), and a similar process is repeated thereafter.

When the read default position corresponds to 3D region 32 (S2:YES), determination is made whether at least one cursor is outside the corresponding image region as described of 3D region 32 with reference to FIG. 3 (S4). When both cursors are within the corresponding image regions (S4:NO), two cursors for the left eye and the right eye are displayed using bit map image data 42 or 43 according to the default position in 3D region 32.

When at least one cursor is outside the corresponding image region (S4:YES), the cursor is displayed at the default position by the OS (S3). The designated default position of the cursor is read out again (S1), and a similar process is repeated thereafter.

Figure 4:
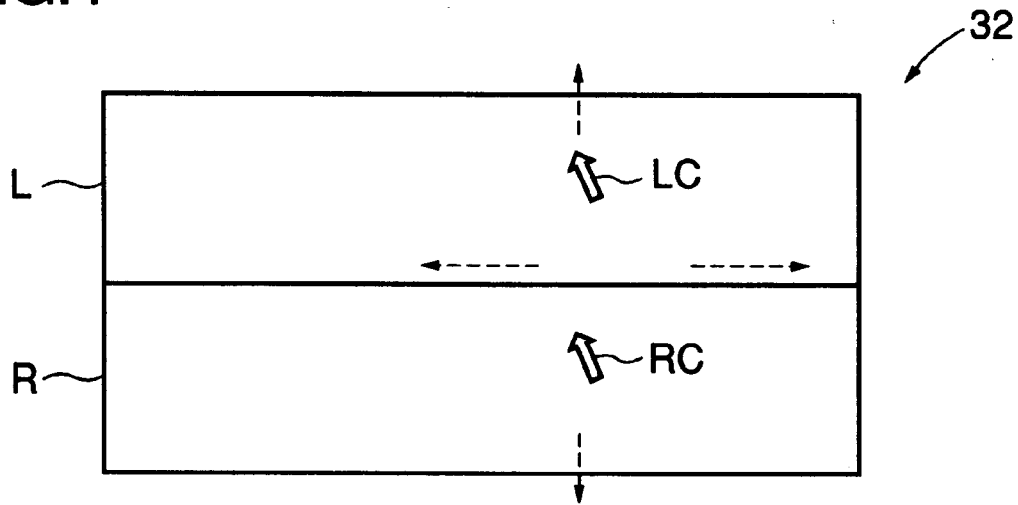
FIG. 4 shows a display of two cursors in the case where an image for the left eye and an image for the right eye are displayed adjacent to each other in the vertical direction in the 3D region of the display of FIG. 1.

FIG. 4 shows an example of the display of two cursors when left-eye image L and right-eye image R are displayed adjacent to each other in the vertical direction in 3D region 32 of display 3 of FIG. 1.

The above process was described for the case where left-eye image L and right-eye image R are adjacent in the horizontal direction in 3D region 32 as shown in FIG. 3. However, a similar cursor display process is allowed for the case of FIG. 4 where images are displayed in the vertical direction.

Figure 5:
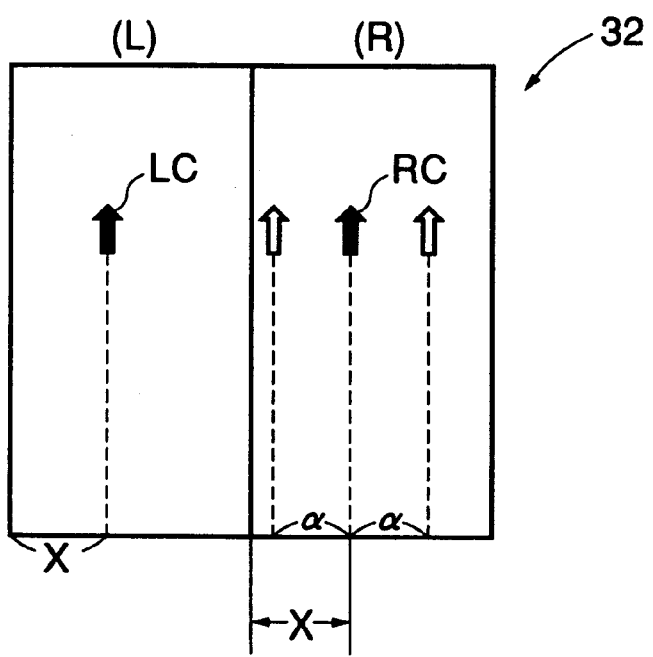
FIG. 5 is a diagram for describing a modification of the cursor display manner in the 3D region of the display of FIG. 1.

FIG. 5 is a diagram for describing modification of a cursor display form of 3D region 32 of display 3 of FIG. 1. In the previous FIG. 3, left-eye cursor LCi and right-eye cursor RCi are displayed in horizontal alignment spaced apart by the relative distance in the horizontal direction between corresponding left-eye image L and right-eye image R. By displaying, for example, right-eye cursor RC at a position shifted by the value of $\pm\alpha$ corresponding to the parallax between left-eye image L and right-eye image R as shown in FIG. 5, the cursor display position can be adjusted in the Z direction of the image (in the screen direction of depth of display 3) in 3D region 32. For example, by shifting the position by just the value of $+\alpha$, the cursor can be displayed in a direction closer to the front panel screen of display 3 from the standpoint of the sense of depth perception. At a position shifted by just the value of $-\alpha$, the cursor can be displayed in a direction to further enhance the sense of depth perception, i.e., in the direction of greater depth on display 3.

A case where a user views a display image on the display in a stereoscopic manner using special eyeglasses will be described hereinafter according to another embodiment of the present invention. In contrast to the cursor display apparatus of FIG. 1 where a display image is viewed stereoscopically without any special eyeglasses, a stereoscopic view is provided using special eyeglasses 7 according to the cursor display apparatus of FIG. 6.

Figure 6:
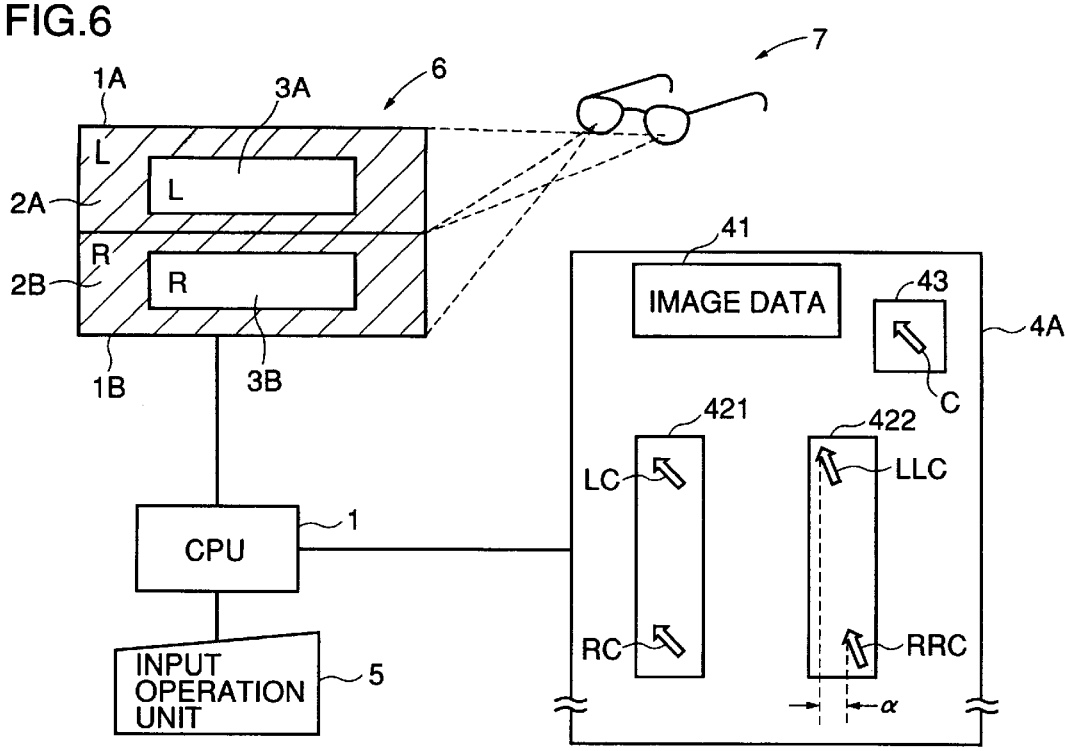
FIG. 6 is a block diagram of a cursor display apparatus according to another embodiment of the present invention.
Figure 7:
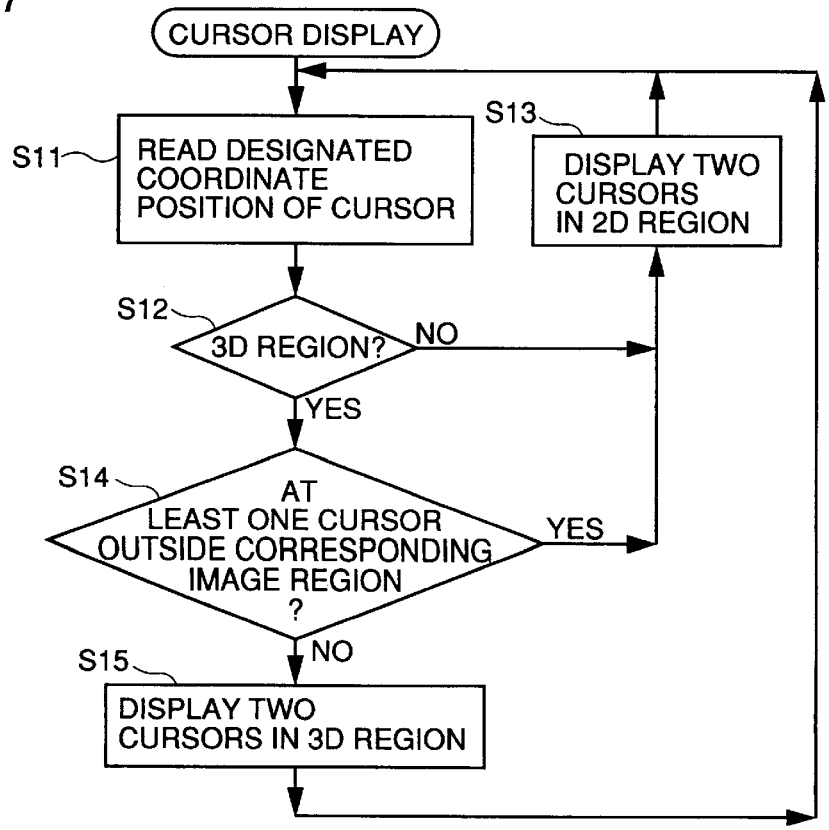
FIG. 7 is a flow chart of a cursor display process according to the cursor display apparatus of FIG. 6.

Referring to FIG. 6, the cursor display apparatus includes a CPU 1, a memory 4A, an input operation unit 5, a display 6, and special eyeglasses 7. Image data 41, bit map image data 421 for a 2D region, bit map image data 422 for a 3D region, and a program corresponding to the flow chart of FIG. 7 are stored in memory 4A.

The display region of display 6 is divided vertically into two regions, i.e. the upper display region 1A for left-eye image L, and the lower display region 1B for right-eye image R. In display region 1A, a 3D region 3A is provided substantially at the center with a shaded 2D region 2A at the perimeter. In display region 1B, a 3D region 3B is provided substantially at the center with a shaded 2D region 2B at the perimeter.

Each of bit map image data 421 and 422 for the 2D and 3D regions are prepared in memory 4A with the image of two cursors so that the left-eye cursor and the right-eye cursor are displayed in the regions of left-eye image L and right-eye image R, respectively. In 2D bit map image data 421, the image is developed so that left-eye cursor LC and right-eye cursor RC are aligned in the vertical direction apart from each other by just the relative distance in the vertical direction between left-eye image L and right-eye image R of 2D regions 2A and 2B. In 3D bit map image data 422, image is developed so that left-eye cursor LLC and right-eye cursor RRC are aligned in a manner similar to 2D bit map image data 421. The data of cursors LLC and RRC of image data 422 have respective images developed at a shifted position corresponding to the value α according to the parallax between left-eye image L and right-eye image R of 3D regions 3A and 3B.

When an image is provided on display 6 by CPU 1, the same image data 41 is displayed as the data of left-eye image L and right-eye image R in 2D regions 2A and 2B. The data of left-eye image L and right-eye image R having parallax, generated by image data 41, are displayed in 3D regions 3A and 3B.

Figure 8:
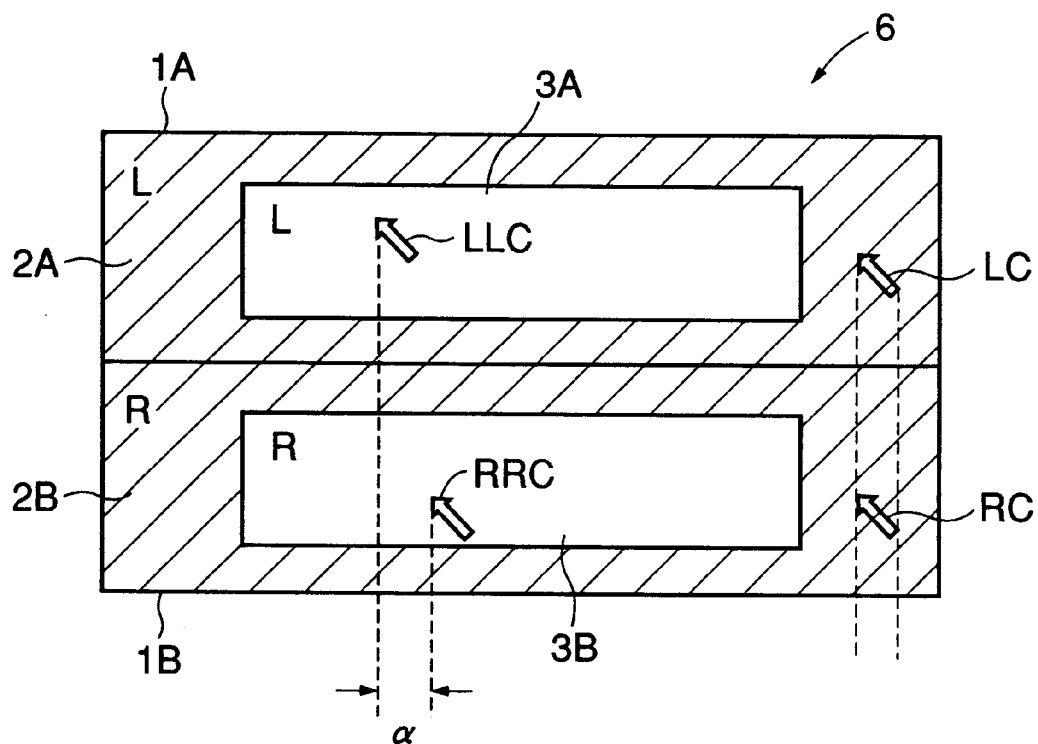
FIG. 8 is a diagram indicating the cursor display switching between a 3D region and a 2D region by the cursor display apparatus of FIG. 6.
Figure 9:
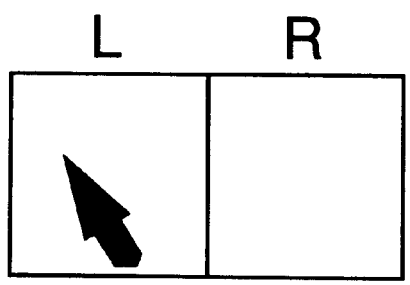
FIG. 9 is a diagram for describing the cursor display manner in a conventional binocular stereoscopic display.

When the default position designated through input operation unit 5 is located in 2D regions 2A and 2B in display 6 as shown in FIG. 8, cursors LC and RC corresponding to 2D bit map image data 421 are displayed according to the default position. Cursors LC and RC are displayed at the same position in left-eye image L and right-eye image R of left-eye image display region 1A and right-eye image display region 1B, i.e., without parallax. Therefore, the user can perceive the cursor as a plane image via special eyeglasses 7.

When the default position is shifted from the 2D region to the 3D region, cursors LLC and RRC according to 3D bit map image data 422 are displayed in 3D regions 3A and 3B, respectively. Since cursors LLC and RRD are displayed shifted by the value of α according to the parallax, the user can perceive the cursor as a stereoscopic image through special eyeglasses 7.

When the default position is shifted from the 3D region to the 2D region, cursors LC and RC are displayed according to 2D bit map image data 421 in 2D region 2A and 2B, respectively, as in the above case.

Also, similar to FIG. 1, bit map image data 43 for one cursor in which the image of one cursor is developed can be prepared in memory 4A. The cursor at the default position by the OS and a cursor C by bit map image data 43 at a position apart by the relative distance in the vertical direction can be displayed at the same time in 3D regions 3A and 3B to provide the display of two cursors for the left eye and the right eye.

The cursor display process will be described with reference to the flow chart of FIG. 7.

First, CPU 1 reads the cursor default position (coordinate values) designated through the coordinate value input device of input operation unit 5 (S11). Determination is made whether the default position is in the 3D region (S12). When the default position does not correspond to the 3D region (S12:NO), the cursor is displayed at the default position using image data 421(S13). The designated default position of the cursor is read again (S11), and a similar process is repeated thereafter.

When the read default position corresponds to the 3D region (S12:YES), determination is made whether at least one of the cursors is located outside the corresponding image region as described of the 3D region with reference to FIG. 3 (S14). When both cursors are within the corresponding image region (S14:NO), two cursors for the left eye and the right eye are displayed using bit map image data 422 according to the default position in 3D regions 3A and 3B (S15).

When at least one cursor is outside the corresponding image region (S14:YES), the cursor is displayed at the default position using image date 421 (S13). The designated default position of the cursor is read again (S11). Then, a similar process is repeated thereafter.

The above process was described for the case where left-eye image L and right-eye image R are displayed adjacent to each other vertically as shown in FIG. 8 in 3D regions 3A and 3B. A similar cursor display process is allowed even for images displayed adjacent to each other horizontally.

The configuration of the cursor is not limited to those of the above embodiments. Also, control can be provided so that the display is switched to a display format of having only the 3D region set in the full screen, having only the 2D region set in the full screen, or having both the 3D region and the 2D region set in the full screen. The cursor display process of the display can be applied as described above to any of these display formats.

Furthermore, the 3D region is not limited to a binocular stereoscopic image display region. A multi-view stereoscopic image display region such as the four-channel or eight-channel system can be used. In this case, data of the number of cursors required for the stereoscopic display (for example, 4 cursors in the four-channel system and 8 cursors in the eight-channel system) can be prestored in a memory as image data in the bit map form such as the bit map image data of FIG. 1 or 6 to be appropriately read out for display. Alternatively, a unitary cursor is prestored in a memory as image data of a bit map form such as 1-cursor bit map image data 43 to read out and copy at the time of display to produce and display the required number of cursors. Thus, in a multi-view system of four channels and more, the corresponding position relationship of the plurality of cursors displayed in the 3D region can be controlled according to the parallax to adjust the position of the cursor in the direction of depth.

Thus, the position of the cursor can be confirmed with both eyes in any of the 3D region and the 2D region of the display. Therefore, proper positioning is allowed. By controlling the position relationship of a plurality of cursors displayed in the 3D region according to the parallax, the cursor can be shifted in the direction of depth that is indispensable for stereoscopic display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. The cursor display method for displaying a cursor in a display having at least one of a stereoscopic image display region and a plane image display region, comprising:

a cursor position read step for reading out a designated position of a cursor in said display, a position determination step for determining whether said read cursor position is inside or outside said stereoscopic image display region, a stereoscopic cursor display step for displaying an image for a stereoscopic cursor image according to said read cursor position in response to determination of inside the region by said position determination step, and a plane cursor display step for displaying a plane cursor image according to said read cursor position in response to determination of outside the region by said position determination step, wherein said stereoscopic cursor display step displays said plane cursor image at a position determined corresponding to said read cursor position for each of a plurality of different plane images with parallax when said plurality of different plane images with parallax are aligned and displayed in said stereoscopic image display region of said display.

2. The cursor display method according to claim 1, wherein the position determined corresponding to said read cursor position is adjusted according to a degree of said parallax for each of said plurality of different plane images.

3. The cursor display method according to claim 1, wherein an image displayed in said stereoscopic image display region is perceived as a stereoscopic image without special eyeglasses.

4. The cursor display method according to claim 1, wherein an image displayed in said stereoscopic image display region is perceived as a stereoscopic image using special eyeglasses.

5. A cursor display apparatus for displaying a cursor in a display having at least one of a stereoscopic image display region and a plane image display region, comprising: cursor position read means for reading a designated position of a cursor in said display, position determination means for determining whether said read cursor position is inside or outside said stereoscopic image display region, stereoscopic cursor display means for providing an image display for a stereoscopic cursor image according to said read cursor position in response to determination of inside the region by said position determination means, and plane cursor display means for displaying a plane cursor image according to said read cursor position in response to determination of outside the region by said position determination means, wherein said stereoscopic cursor display means displays said plane cursor image at a position determined corresponding to said read cursor position for each of a plurality of different plane images with parallax when said plurality of different plane images are aligned and displayed in said stereoscopic image display region of said display.

6. The cursor display apparatus according to claim 5, wherein said position determined corresponding to said read cursor position is adjusted according to a degree of said parallax for each of said plurality of different plane images.

7. The cursor display apparatus according to claim 5, wherein an image displayed in said stereoscopic image display region is perceived as a stereoscopic image without special eyeglasses.

8. The stereoscopic cursor display apparatus according to claim 5, wherein an image displayed in said stereoscopic image display region is perceived as a stereoscopic image using special eyeglasses.

9. A computer-readable recording medium in which a cursor display program is recorded for a computer to execute a cursor display method of displaying a cursor in a display having at least one of a stereoscopic image display region and a plane image display region, said cursor display method comprising:

a cursor position read step for reading a designated position of a cursor in said display, a position determination step for determining whether said read cursor position is inside or outside said stereoscopic image display region, a stereoscopic cursor display step for displaying an image for a stereoscopic cursor image according to said read cursor position in response to determination of inside the region by said position determination step, and a plane cursor display step for displaying a plane cursor image according to said read cursor position in response to determination of outside the region by said position determination step, wherein said stereoscopic cursor display step displays said plane cursor image at a position determined corresponding to said read cursor position for each of a plurality of different plane images with parallax when said plurality of different plane images with parallax are aligned and displayed in said stereoscopic image display region of said display.

* * * * *